3,307,942
XEROGRAPHIC MEMBER AND PROCESS THEREFOR

Albert J. Cole, New Hanover Township, Montgomery, County, Pa., assignor to The Firestone Tire & Rubber Company, a corporation of Ohio
No Drawing. Filed Mar. 29, 1963, Ser. No. 269,194
39 Claims. (Cl. 96—1.8)

This invention relates in general to xerography and in particular to xerographic plates and processes for using and producing such plates.

Since the discovery of xerography by Carlson, a number of xerographic plates have been developed. One of the most significant of the advances in xerographic plate manufacture was the discovery of the "binder plate" by A. E. Middleton. A general description of these plates and their method of manufacture is given by Middleton in U.S. 2,663,636. In the binder plate the photoconductive insulating layer comprises a finely divided photoconductive material dispersed in an electrically insulating resinous binder, whence the term "binder plate." Binder plates are made by dissolving the resin in an organic solvent, dispersing the finely divided photoconductor in the solution and then coating the suspension on the desired substrate. A wide variety of photoconductive compounds are useful in preparing binder plates. A broad list of such materials is given, for example, in the Middleton patent, supra, and in U.S. 2,862,815 by Sugarman et al. Particularly preferred photoconductors for use in preparing binder plates are the sulfides and selenides of zinc and cadmium.

Because of their low cost and wide availability, zinc oxide and tetragonal lead monoxide have been particularly interesting materials for use in binder plates. At present the most widely used binder plate is made by coating an organic solvent solution of a resin containing zinc oxide as the photoconductor onto a paper backing. As zinc oxide is a common paper coating pigment, such a structure would appear potentially to be no more expensive than ordinary magazine paper. To date, however, this potential has not been realized. Thus the necessity of using organic solvents adds considerably to the cost of the finished paper, due, in part, to the necessity for special apparatus for solvent recovery and to minimize vapors and fumes. Attempts have been made to eliminate the organic solvent and apply the coating in an aqueous system. Such attempts have either resulted in films having drastically diminished electrical insulating properties and increased sensitivity to moisture or require special handling as by a preliminary heat treatment prior to use.

In addition to the cost imposed by the use of solvent coating, the exacting xerographic requirements placed on the binder plate have necessitated the use of premium-price resins. Thus, while many inexpensive resins are known as having excellent electrical resistance, it has been found that resins such as silicones and certain acrylic resins are far superior to convention resins such as butadiene-styrene copolymers in the xerographic properties of binder plates prepared therefrom.

It has now been found that binder plates having excellent xerographic properties may be prepared using any of the conventional photoconductive pigments suspended in a novel aqueous latex as hereinafter described. The resulting aqueous coating system may be handled in conventional paper machinery to apply the coating to the paper web, using conventional techniques for handling aqueous coating compositions. The novel aqueous latex used herein comprises a terpolymer of a monovinyl aromatic compound, a conjugated diolefin and shellac. Latexes prepared from these materials are described in the copending application Serial No. 269,154 of Floyd L. Edris for Polymers and Process Therefor, filed on even date herewith and incorporated herein by reference thereto. The terpolymers useful in the binder plates of the instant invention consist of those polymers as described by Edris containing from about 80 to about 60 weight percent monovinyl aromatic compound and the remainder a conjugated diolefin monomer. In addition, the terpolymers contain from about 2 to about 30, and preferably from about 5 to about 15 parts of shellac per 100 parts of monomer. The monovinyl aromatic compounds useful herein are styrene, alpha-methyl styrene, alpha-chloro styrene and the corresponding halo, nitro, methyl and ethyl nuclear-substituted derivatives thereof such as the vinyl toluenes, p-chlorostyrene, p-nitrostyrene, etc. The conjugated diolefins used in this invention are butadiene-1,3, isoprene, chloroprene, pentadiene-1,3, piperylene and mixtures of two or more of such diolefins.

Any commercial grade of shellac may be used. Some grades such as orange shellac produce color and/or cloudiness in the polymer. The physical properties of latexes produced with such shellacs are satisfactory, but because of the color their use is generally restricted to applications where this is not critical. It is preferred to use a refined shellac, i.e., a shellac which has been both bleached and dewaxed. In addition to natural shellac, any other natural or synthetic polymer which is alkali soluble and is used by the art as a chemical equivalent of shellac may be substituted for natural shellac in whole or in part in the instant invention.

Thus, the latex comprises a monovinyl aromatic compound, a conjugated diolefin and a shellac to serve as the emulsifying agent and to itself enter into the polymer by a grafting reaction. In addition, if desired, minor amounts, that is less than 25% by weight, of inert monomers copolymerizable with the vinyl aromatic compound and the conjugated diolefin may be added to the polymerization system. By "inert" is meant that the monomer does not react deleteriously with the other consituents of the latex. Such inert monomers include isopropenyl ketone, vinylidene chloride, acrylonitrile, alkyl acrylates such as butyl acrylate, alkyl methacrylates such as methyl methacrylate, etc. Divinyl benzene may also be used as a comonomer as long as the amount used does not impart undue brittleness to the polymer.

The latex is prepared by dissolving the shellac or other alkali-soluble shellac-type polymer in water using ammonia or borax as the solubilizing agent, adjusting the pH of the solution to from about 6.5 to 8.3, adding a free radical catalyst and the monomers and carrying out the polymerization at from about 15° C. to about 100° C., preferably from about 40° C. to about 80° C. Any of the free radical catalysts known to the art for the emulsion polymerization of butadiene-styrene may be used herein, such as azobisbutyronitrile, methyl ethyl ketone peroxide, benzoyl peroxide, t-butyl hydroperoxide, cumene hydroperoxide, ammonium, sodium or potassium persulfate, etc. If desired, the free radical cataylst may be activated by a suitable redox system as known to those skilled in the art. The monomers may be charged to the polymerization vessel intermittently or continuously as the polymerization proceeds or the entire charge of monomers may be added to the vessel prior to the initiation of polymerization. Additional catayist or redox material may also be added to the system as the polymerization proceeds. Latexes prepared in this manner contain from about 30–40% solids by weight.

The shellac or shellac-type polymer constitutes the sole emulsifier in preparing the latexes of the invention. The use of additional surfactants, even nonionic surfactants as taught by Frey et al. in U.S. 2,961,420 results in a latex which is unsatisfactory as the binder in a binder plate. Also, in solubilizing the shellac or shellac-type polymer, organic amines as diethanolamine, etc., are to be avoided. It has been found that water soluble inorganic salts such as sodium sulfate can be added to the latex, even in considerable amount, without adverse effect on the xerographic properties of a binder plate prepared from such latex. To obtain efficient dispersing action there must be about 2% by weight of shellac or shellac-type polymer based on the monomers. Improved mechanical stability in the latex and improved clarity in films cast from the latex is obtained by using at least about 5% by weight of shellac. No significant improvement in physical properties has been noted with more than about 10% by weight of shellac. Accordingly, the use of larger amounts of shellac will be dictated generally by commercial considerations. It is preferred not to use more than about 30% shellac by weight. The preferred amount of shellac or shellac-type polymer is from about 5% to about 15% by weight based on the monomers. The preferred pH for the initiation of polymerization is from about 7 to 7.8.

As stated, any of the conventional photoconductive pigments may be used in formulating binder plates with the aqueous latex as herein described. Such pigments include, without limitation, those set forth by Sugarman et al. in U.S. 2,862,815 and include, for example, the colored oxides, sulphides, selenides, tellurides and iodides of cadmium, mercury, antimony, bismuth, thallium, indium, molybdenum, aluminum, lead and zinc. In addition, arsenic trisulphide, cadmium arsenide, lead chromate and selenium may be used. Particularly preferred as the photoconductive pigment are zinc oxide, tetragonal lead monoxide, the sulfides and selenides of zinc and cadmium, and mixtures of zinc oxide and red mercuric sulfide. The pigment is first dispersed in water using a dispersing aid such as potassium tripolyphosphate, an anionic surfactant, etc. The pigment dispersion is then blended with the latex in the desired ratio, the solids content adjusted, and the coating mixture applied to the substrate using conventional coating equipment as an air knife, roller, dip blade, etc. The use of moderate amounts of a dispersing aid to disperse the pigment has no adverse effect on the xerographic properties of the films. However, the addition of the same amount of dispersing aid to the unpigmented latex results in films having poor electrostatic properties, as is set forth in the copending application of Edris. If desired, a photographic sensitizing dye may also be added to the coating to improve the light sensitivity of the coating. The use of such dyes is set forth, for example, in U.S. 3,051,569 to Sugarman et al. and in U.S. 3,052,540 to Greig. The ratio of pigment to binder in the coating mixture is not critical. The ratios normally used in the art range from 1 to 10 parts of pigment to one part of binder. The precise ratio used will vary according to the end use and other considerations of the formulator. In general, a ratio of from about 1.5 to 5 parts of pigment to one part of binder is preferred.

The economies possible by the use of the aqueous coating mixture of the invention are most clearly realized when the coating is applied to a paper web and accordingly this constitutes a preferred embodiment of the invention. However, the invention is not limited thereto and the coating composition may be applied to any type of substrate as is conventional in the art. It is preferred that the substrate be electrically conductive or semi-conductive as for example paper, metal, electrically conductive plastic or plastic or glass coated with an electrically conductive layer and may be flexible or rigid. If desired, the coating may also be applied to a completely insulating substrate in which case a special charging device must be utilized to supply an artificial ground plane as is necessary in xerographic processes. Such a device, termed a double corona, is described, for example, in U.S. 2,922,883. Where paper is used as the substrate, the paper itself may be first coated with a subbing layer or may be otherwise treated as by addition of hygroscopic salts, carbon black, metallic powders, etc., to impart a higher degree of electrical conductivity to the paper web. Wet strength resins, dyes and other additives normally added in the papermaking process may be used without detracting from the utility of the web to serve as the substrate in the instant invention. The substrate may be flexible or rigid and in any desired geometric configuration.

The layer obtained by application of the coating mixture to the substrate may be any desired thickness as is conventional in the art. Generally, a thickness in the range of from about 10 to 500 microns has been found satisfactory. Desirably, the coating is heated for a few minutes. It is believed that the heating completes the drying operation and improves the bond of the pigment and binder. The binder plate produced according to the instant invention has a photoconductive insulating layer comprising a photoconductive pigment, dispersed in the terpolymer binder. Such a layer is firmly bonded to the substrate and has excellent flexibility, bonding strength and toughness. Further, the layer has excellent xerographic properties. Electrostatic images developed on the photoconductive insulating layers of the invention are at least as good as products made employing the conventional organic solvent coating techniques and using premium (and expensive) resin binders.

The following examples embodying the invention are given for illustrative purposes and not by way of limitation. All parts are by weight unless otherwise specified. The zinc oxide used was Photox 801, obtained from New Jersey Zinc Co. A bleached and dewaxed shellac was used.

*Example 1*

A polymerization vessel was charged with 8 parts shellac, 0.8 part concentrated ammonia and 150 parts water. The mixture was heated to 70° C. with agitation to effect solution of the shellac. Then 25 parts butadiene, 67 parts styrene and 0.1 part potassium persulfate were added and the batch polymerized at 65° C. The polymerization was completed after 20 hours. The pH at the start of polymerization was 7.8. The finished latex had a pH of 6.0. Additional ammonia was added to the finished latex to adjust the pH to 9.5. The floc was 0.1%.

175 g. of zinc oxide was weighed into a jar with 70 g. of water in which 1.5 g. of an anionic dispersant, obtained under the tradename Tamol 731, has been dissolved. Four ¾" flintstones were added to the jar and the jar rolled at 100 r.p.m. for one hour. At the end of this time, the latex was added to the jar to give a pigment to resin solids ratio of 3.5:1. Water was added to give a total solids content of 55 to 58%. Milling was continued for an additional half hour. The resulting slurry contained 12.8% latex as solids in the fluid mix; with 22.2% latex in the dry film. The mixture was coated on two different grades of paper, the one Offset Enamel and the other Fotolith, both obtained from S. D. Warren Co., using an air knife coater. The coating was applied at a weight of about 22 lbs./ream. The coating was air-dried, then heated at 150° C. for 2-3 minutes. The paper was then conditioned in the dark in a room having a relative humidity of about 50%. The paper was then charged using a corona charging device and tested in the xerographic process as described, for example, by Carlson in U.S. 2,297,691. The images developed on the paper so prepared were at least as good as images developed on a zinc oxide coated paper made from a solution of silicone resin in a toluene-xylene mixture.

Similarly, binder plates may be prepared from the latex as described substituting tetragonal lead monoxide for the zinc oxide.

Examples 2 thru 8

A coating mixture prepared as in Example 1 was used to coat Fotolith paper stock at coating weights of 11, 12, 14, 17, 19, 23 and 27 lbs./ream for Examples 2 through 8 respectively. Xerographic prints were then prepared on each of the paper stocks so coated. In each case the developed image was at least as good as images developed on the zinc oxide coated paper made from a mixture of silicone resin in a toluene-xylene mixture. The paper coated on the basis weight of 14 lbs./ream (Example 4) gave the best quality xerographic print.

Examples 9 thru 11

A series of three coating mixtures was prepared as described in Example 1, excepting that the ratios of styrene, butadiene, and shellac used in preparing the latexes were varied as set forth:

| Example | Styrene | Butadiene | Shellac |
| --- | --- | --- | --- |
| 9 | 73 | 18 | 9 |
| 10 | 69 | 29 | 2 |
| 11 | 67 | 25 | 8 |

The latexes so prepared were then used to prepare a coating mixture precisely as described in Example 1 and the mixtures used to coat the Fotolith paper base with the basis weight of about 22 lbs./ream. Xerographic plates prepared from the resulting papers were in each case at least as good as images prepared on zinc oxide coated paper made from a solution of silicone resin in a toluene-xylene mixture.

Similarly, binder plates may be prepared from the latexes as described substituting zinc sulfide for the zinc oxide.

The binder-pigment layers produced as herein described have excellent flexibility, tensile strength and bonding strength. Highly adherent coatings may be produced on a variety of substrates. If desired, plasticizers may be added to the latex, but their use is not necessary. The binder plates may be overcoated by a thin layer of protective resin, as known to those skilled in the art. The developed images on the binder plate may be affixed thereto or transferred to another surface as is conventional in xerography. It is believed that the unique properties of the latexes described in the formulation of binder plates is due to the shellac which forms a graft copolymer, as described in the copending application of Edris. In the latexes prepared as described, about 90% of the shellac is chemically bound in the interpolymer.

What is claimed is:

1. A xerographic binder plate comprising a substrate having firmly bonded thereto a continuous photoconductive insulating layer comprising photoconductive particles uniformly dispersed through a resinous layer comprising a copolymer of from about 2 to about 30 parts by weight of alkali-soluble shellac, from about 60 to about 80 parts by weight of at least one monovinyl aromatic compound and from about 20 to about 40 parts by weight of at least one conjugated diolefin, the ratio of said photoconductor to said resin in said layer on a dry basis being within the range of from about 1 to 10 parts of photoconductor to 1 part of resin by weight.

2. A xerographic plate according to claim 1 wherein the shellac is a bleached and dewaxed shellac.

3. A xerographic plate according to claim 1 wherein the shellac is present in the copolymer in an amount of from about 5 to about 15 parts by weight.

4. A xerographic plate according to claim 1 wherein the photoconductive particles are selected from the group consisting of the oxides, iodides, selenides, sulfides and tellurides of zinc, antimony, aluminum, bismuth, cadmium, mercury, molybdenum, and lead, selenium, arsenic trisulfide, lead chromate and cadmium arsenide.

5. A xerographic plate according to claim 4 wherein the photoconductive particles are zinc oxide.

6. A xerographic plate according to claim 1 wherein the substrate is paper.

7. A xerographic plate according to claim 1 wherein the monovinyl aromatic compound is selected from the group consisting of styrene, alpha-methyl styrene, alpha-chloro styrene and the halo, nitro, methyl and ethyl nuclear-substituted derivatives thereof and the diolefin is selected from the group consisting of butadiene-1,3, isoprene, chloroprene, pentadiene-1,3 and piperylene.

8. A xerographic plate according to claim 7 wherein the vinyl aromatic compound is styrene and the diolefin is butadiene-1,3.

9. A xerographic binder plate comprising a substrate having firmly bonded thereto a continuous photoconductive insulating layer comprising photoconductive particles uniformly dispersed through a resious layer comprising a copolymer of from about 2 to about 30 parts by weight of an alkali-soluble shellac, from about 60 to about 80 parts by weight of at least one monovinyl aromatic compound, from about 20 to about 40 parts by weight of at least one conjugated diolefin and from about 1 to about 25 parts by weight of an inert copolymerizable monomer, the ratio of said photoconductor to said resin in said layer on a dry basis being within the range of from about 1 to 10 parts of photoconductor to 1 part of resin by weight.

10. A xerographic plate according to claim 9 wherein the monovinyl aromatic compound is selected from the group consisting of styrene, alpha-methyl styrene, alpha-chloro styrene and the halo, nitro, methyl and ethyl nuclear-substituted derivatives thereof, the conjugated diolefin is selected from the group consisting of butadiene-1,3, isoprene, chloroprene, pentadiene-1,3 and piperylene, and the copolymerizable monomer is selected from the group consisting of isopropenyl ketone, vinylidene chloride, acrylonitrile, alkyl acrylates and alkyl methacrylates.

11. The method of producing a xerographic binder plate which comprises coating a substrate with an aqueous suspension of finely divided photoconductive particles dispersed in an aqueous latex comprising a copolymer of from about 2 to about 30 parts by weight of alkali-soluble shellac, from about 60 to about 80 parts by weight of a monovinyl aromatic compound and from about 20 to about 40 parts by weight of a conjugated diolefin, the ratio of photoconductive particles to copolymer being within the range of from about 1 to 10 parts of photoconductive particles to 1 part of copolymer by weight and heating the coated substrate to produce a photoconductive insulating layer firmly bonded to the substrate.

12. The method according to claim 11 wherein the shellac is a bleached and dewaxed shellac.

13. The method according to claim 11 wherein the shellac is present in the copolymer in an amount of from about 5 to about 15 parts by weight.

14. The method according to claim 11 wherein the photoconductive particles are selected from the group consisting of the oxides, iodides, selenides, sulfides and tellurides of zinc, antimony, aluminum, bismuth, cadmium, mercury, molybdenum and lead, selenium, arsenic trisulfide, lead chromate and cadmium arsenide.

15. The method according to claim 14 wherein the photoconductive particles are zinc oxide.

16. The method according to claim 11 wherein the substrate is paper.

17. A method according to claim 11 wherein the monovinyl aromatic compound is selected from the group consisting of styrene, alpha-methyl styrene, alpha-chloro styrene and the halo, nitro, methyl and ethyl nuclear-substituted derivatives thereof and the diolefin is selected from the group consisting of butadiene-1,3, isoprene, chloroprene, pentadiene-1,3 and piperylene.

18. A method according to claim 17 wherein the vinyl aromatic compound is styrene and the diolefin is butadiene-1,3.

19. A method of producing a xerographic binder plate which comprises coating a substrate with an aqueous suspension of finely divided photoconductive particles dispersed in an aqueous latex comprising a copolymer of from about 2 to about 30 parts by weight of an alkali-soluble shellac, from about 60 to about 80 parts by weight of at least one monovinyl aromatic compound, from about 20 to about 40 parts by weight of at least one conjugated diolefin and from about 1 to about 25 parts by weight of an inert copolymerizable monomer, the ratio of said photoconductive particles to said copolymer being within the range of from about 1 to 10 parts of photoconductor to 1 part of copolymer by weight, and heating the coated substrate to produce a photoconductive insulating layer firmly bonded to the substrate.

20. A method according to claim 19 wherein the monovinyl aromatic compound is selected from the group consisting of styrene, alpha-methyl styrene, alpha-chloro styrene and the halo, nitro, methyl and ethyl nuclear-substituted derivatives thereof, the conjugated diolefin is selected from the group consisting of butadiene-1,3, isoprene, chloroprene, pentadiene-1,3 and piperylene, and the copolymerizable monomeric is selected from the group consisting of isopropenyl ketone, vinylidene chloride, acrylonitrile, alkyl acrylates and alkyl methacrylates.

21. A coating mixture for use in preparing xerographic binder plates comprising an aqueous suspension of finely divided photoconductive particles and resin latex particles, said resin latex particles comprising a graft copolymer of from about 2 to about 30 parts by weight of alkali-soluble shellac on a copolymer of from about 60 to about 80 parts by weight of a monovinyl aromatic compound and from about 20 to about 40 parts by weight of a conjugated diolefin.

22. A coating mixture according to claim 21 wherein the shellac is a bleached and dewaxed shellac.

23. A coating mixture according to claim 21 wherein the shellac is present in the copolymer in an amount of from about 5 to about 15 parts by weight.

24. A coating mixture according to claim 21 wherein the photoconductive particles are selected from the group consisting of the oxides, iodides, selenides, sulfides and tellurides of zinc, antimony, aluminum, bismuth, cadmium, mercury, molybdenum and lead, selenium, arsenic trisulfide, lead chromate and cadmium arsenide.

25. A coating mixture according to claim 24 wherein the photoconductive particles are zinc oxide.

26. A coating mixture according to claim 21 wherein the monovinyl aromatic compound is selected from the group consisting of styrene, alpha-methyl styrene, alpha-chloro styrene and the halo, nitro, methyl and ethyl nuclear-substituted derivatives thereof and the diolefin is selected from the group consisting of butadiene-1,3, isoprene, chloroprene, pentadiene-1,3 and piperylene.

27. A coating mixture according to claim 26 wherein the monovinyl aromatic compound is styrene and the diolefin is butadiene-1,3.

28. A coating mixture for use in preparing xerographic binder plates comprising an aqueous suspension of finely divided photoconductive particles and resin latex particles, said resin latex particles comprising a graft copolymer of from about 2 to about 30 parts by weight of an alkali-soluble shellac on a copolymer of from about 60 to about 80 parts by weight of at least one monovinyl aromatic compound, from about 20 to about 40 parts by weight of at least one conjugated diolefin and from about 1 to about 25 parts by weight of an inert copolymerizable monomer.

29. A coating mixture according to claim 28 wherein the monovinyl aromatic compound is selected from the group consisting of styrene, alpha-methyl styrene, alpha-chloro styrene and the halo, nitro, methyl and ethyl nuclear-substituted derivatives thereof, the conjugated diolefin is selected from the group consisting of butadiene-1,3, isoprene, chloroprene, pentadiene-1,3 and piperylene, and the copolymerizable monomer is selected from the group consisting of isopropenyl ketone, vinylidene chloride, acrylonitrile, alkyl acrylates and alkyl methacrylates.

30. A process for xerography which comprises providing a backing sheet having a surface coated with a composition comprising from about 50 to about 91% by weight of a finely divided photoconductor suspended in from about 50 to about 9% by weight of a resin binder, said resin comprising a copolymer of from about 2 to about 30 parts by weight of an alkali-soluble shellac, from about 60 to about 80 parts by weight of a monovinyl aromatic compound and from about 20 to about 40 parts by weight of a conjugated diolefin and forming an electrostatic image on said coated surface which is developed by the application of an electroscopic powder to said electrostatic image.

31. A process of xerography according to claim 30 wherein the shellac is a bleached and dewaxed shellac.

32. A process of xerography according to claim 30 wherein the shellac is present in the copolymer in an amount of from about 5 to about 15 parts by weight.

33. A process of xerography according to claim 30 wherein the photoconductive particles are selected from the group consisting of the oxides, iodides, selenides, sulfides and tellurides of zinc, antimony, aluminum, bismuth, cadmium, mercury, molybdenum, and lead, selenium, arsenic trisulfide, lead chromate and cadmium arsenide.

34. A process of xerography according to claim 33 wherein the photoconductive particles are zinc oxide.

35. A process of xerography according to claim 30 wherein the substrate is paper.

36. A process of xerography according to claim 30 wherein the monovinyl aromatic compound is selected from the group consisting of styrene, alpha-methyl styrene, alpha-chloro styrene and the halo, nitro, methyl and ethyl nuclear-substituted derivatives thereof and the diolefin is selected from the group consisting of butadiene-1,3, isoprene, chloroprene, pentadiene-1,3 and piperylene.

37. A process of xerography according to claim 36 wherein the monovinyl aromatic compound is styrene and the diolefin is butadiene-1,3.

38. A process of xerography which comprises providing a backing sheet having a surface coated with a composition comprising from about 50 to about 91% by weight of a finely divided photoconductor suspended in from about 50 to about 9% by weight of a resin binder, said resin comprising a copolymer of from about 2 to about 30 parts by weight of an alkali-soluble shellac, from about 60 to about 80 parts by weight of at least one monovinyl aromatic compound, from about 20 to about 40 parts by weight of at least one conjugated diolefin and from about 1 to about 25 parts by weight of an inert copolymerizable monomer, and forming an electrostatic image on said coated surface which is developable by the application of an electroscopic powder to said electrostatic image.

39. A process of xerography according to claim 38 wherein the monovinyl aromatic compound is selected from the group consisting of styrene, alpha-methyl styrene, alpha-chloro styrene and the halo, nitro, methyl and ethyl nuclear-substituted derivatives thereof, the conjugated diolefin is selected from the group consisting of butadiene-1,3, isoprene, chloroprene, pentadiene-1,3, and piperylene, and the copolymerizable monomer is selected from the group consisting of isopropenyl ketone, vinylidene chloride, acrylonitrile, alkyl acrylates and alkyl methacrylates.

No references cited.

NORMAN G. TORCHIN, *Primary Examiner.*